Dec. 29, 1942.  L. YOST  2,306,583
TURBINE RUNNER AND GUIDE ASSEMBLY
Filed May 1, 1941

Lloyd Yost
INVENTOR.

BY
ATTORNEY.

Patented Dec. 29, 1942

2,306,583

UNITED STATES PATENT OFFICE 2,306,583

TURBINE RUNNER AND GUIDE ASSEMBLY

Lloyd Yost, Los Angeles, Calif., assignor to A. O. Smith Corporation, Milwaukee, Wis., a corporation of New York Application May 1, 1941, Serial No. 391,337

8 Claims. (Cl. 253—152)

This invention relates to a turbine runner and guide assembly and has been applied particularly in multiple stage turbines of small diameter and considerable length such as those employed in the drilling of oil wells.

The invention constitutes an improvement upon the inventions set forth and claimed in co-pending application, Serial Number 391,336, filed May 1, 1941, for Mud turbine and method of assembling the same; and Serial Number 391,338, filed May 1, 1941, for Radial bearings for turbine driven drills, by the same inventor. In those applications, there is described a turbine employing alternate runners and guides secured to the shaft and the casing respectively. The runners are secured to the shaft by a split wedge sleeve intermediate the runner and shaft. The guide is secured to the casing against rotation by a key and its longitudinal position is determined by spacer sleeves. Each guide has a bearing sleeve of rubber in which the shaft rotates.

The object of the present invention is to protect the shaft from wear at the several guide bearings.

Another object is to provide readily replaceable bearing surfaces for the rotating shaft.

Other objects and advantages will be set forth in connection with the following description of an embodiment of the invention illustrated in the accompanying drawing.

Figure 1:
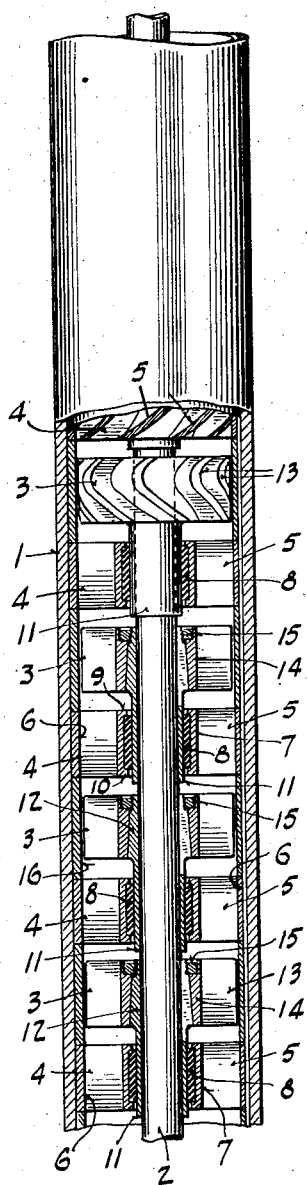
Figure 1 is a side elevation of a turbine with parts in section.
Figure 2:
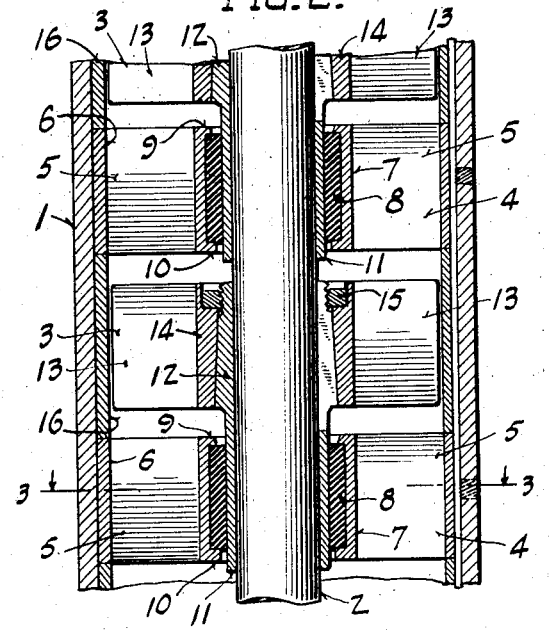
Fig. 2 is a detail longitudinal section showing a runner and adjacent guides.
Figure 3:
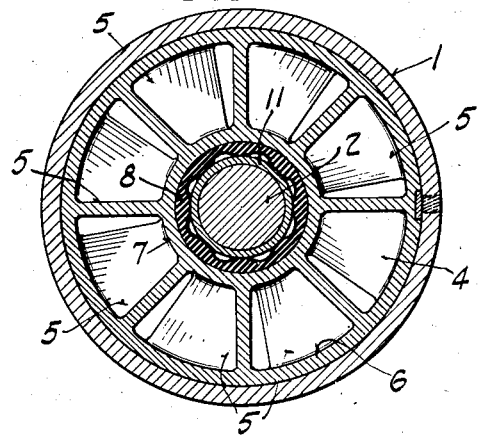
Fig. 3 is a transverse section on line 3—3 of Fig. 2.

The turbine comprises in general a cylindrical casing 1, a rotating shaft 2 disposed axially of the casing with suitable end bearings for the shaft, and a plurality of stages of runners 3 and guides 4 alternating in the body of the turbine and constituting the rotor and stator, respectively.

Each of the guides 4 comprises a series of radial stator blades 5 secured at their outer edges by a circumferential web 6 and at their inner edges by a corresponding web 7. The web 7 carries a fluted rubber bearing sleeve 8 between upper and lower flanges 9 and 10, respectively. Heretofore, and in accordance with the inventions set forth in the applications above referred to the bearing sleeves 8 have directly engaged the shaft 2.

In the present invention the bearing sleeve is radially spaced from the shaft 2 by an intermediate metal sleeve 11 which is made of suitable hard wear resistant bearing metal to protect the shaft from wear.

The sleeve 11 may be formed integrally with or welded to the wedge ring 12 for holding the runner 3 in place on the shaft. As set forth in the applications above referred to, each runner 3 comprises a series of radial rotor blades 13 secured at their inner edges by a hub 14. The inner surface of hub 14 is tapered, constituting a frustum of a cone. The wedge ring 12 has its outer surface tapered complementary to the inner surface of hub 14 with the thicker part at its lower edge and thinner part at its upper edge. A nut 15 threaded onto the thin part of ring 12 applies the wedge action and tightens the ring between the shaft and web.

The sleeve 11 forms an extension downwardly on the lower end of ring 12, and it continues along the shaft to a point beneath the bearing 8. The ring 12 and its depending sleeve or skirt 11 is split longitudinally from a point about one-half inch below the thickest part of the wedge to at least a point adjacent the threads at the upper end, and preferably way to the top of the ring. This provides for contraction of the ring under the wedging action. The sleeve 11, however, should be continuous and free from any split at bearing 8.

In the embodiment illustrated each runner 3 carries a sleeve 11 extending downwardly for the bearing 8 of the adjacent guide next below it. It is possible to provide that the sleeves 11 extend upwardly from the runners 3 to serve the guide bearings 8 above, instead. However, the embodiment shown has advantages in assembly and construction.

In carrying out the assembly method described in the first of the above referred to applications, an improvement is provided in the present instance by assembling the runners and guides in sets before they are dropped in place over the shaft. This is accomplished by assembling the guide 4 on the sleeve 11 to a point where ring 12 and hub 14 engage the guide. The whole is then dropped over the shaft 2 and lowered until the guide engages the outer spacer ring 16 which supports it in place above the runner beneath it. The nut 15 is then tightened and the next set assembled. The rings 16 can be assembled with the respective sets or applied separately. After the assembly is completed the shaft and its runners are raised vertically to provide the proper clearance between runners and guides, as shown in the drawings.

Various embodiments of the invention may be employed within the scope of the accompanying claims.

I claim:

1. In a device of the class described, a rotary shaft, a rotor member, a wedge ring intermediate said member and shaft to removably secure said member to said shaft, a bearing for said shaft adjacent said rotor, and a skirt on said wedge ring extending beneath said bearing to protect said shaft from wear from said bearing.

2. In a device of the class described, a rotary shaft, a plurality of rotor members spaced apart on said shaft, each rotor member having a frusto conical inner surface spaced radially from said shaft, a longitudinally split sleeve fitting said shaft and having a frusto conical outer surface complementary to said inner surface for each rotor member, means for wedging said sleeves between their respective rotor members and the shaft to secure said rotor members in place, stator members intermediate said rotor members, rubber bearing sleeves carried by said stator members to support said shaft against lateral movement, and cylindrical skirts on said wedging means and extending along said shaft to engage said bearing sleeves and protect the shaft against wear.

3. In a device of the class described, a rotary shaft, a rotor member thereon and having a frusto conical inner surface spaced from said shaft, a longitudinally split sleeve fitting said shaft and having an outer surface complementary to the inner surface of said rotor member, means for wedging said sleeve between the rotor member and shaft to secure the member in place, a cylindrical skirt extension on said sleeve, and a bearing engaging said skirt to support the rotor and shaft against lateral movement.

4. In a turbine, a wedge ring for securing a rotor member on the turbine shaft, comprising a cylindrical sleeve of a length to pass beneath one set of stator and rotor members, one end of said sleeve presenting a smooth cylindrical surface for receiving a bearing carried by the stator member, and the other end of said sleeve having an outer surface of frusto conical dimensions to wedge between the shaft and rotor member and secure the latter in place.

5. In a turbine, a wedge ring for securing a rotor member on the turbine shaft, comprising a cylindrical sleeve of a length to pass beneath one set of stator and rotor members, one end of said sleeve presenting a smooth cylindrical surface for receiving a bearing carried by the stator member, and the other end of said sleeve having an outer surface of frusto conical dimensions to wedge between the shaft and rotor member and secure the latter in place, the sleeve tapering in the wedge portion from a maximum thickness near the center to a minimum thickness at the end, and a threaded nut on the said thinner end and engaging the rotor for effecting the wedging action.

6. In a turbine, a wedge ring for securing a rotor member on the turbine shaft, comprising a cylindrical sleeve of a length to pass beneath one set of stator and rotor members, one end of said sleeve presenting a smooth cylindrical surface for receiving a bearing carried by the stator member, and the other end of said sleeve having an outer surface of frusto conical dimensions to wedge between the shaft and rotor member and secure the latter in place, the sleeve tapering in the wedge portion from a maximum thickness near the center to a minimum thickness at the end, and a threaded nut on the said thinner end and engaging the rotor for effecting the wedging action, said sleeve having a longitudinal slit in the wedge portion thereof to provide for tightening of the sleeve on the shaft.

7. In assembling turbines of the class described, the steps comprising first assembling a stator guide member with its bearing on the sleeve extension of the rotor, thereafter applying said stator and rotor set to the shaft, tightening the rotor sleeve upon the shaft, and similarly assembling and applying additional sets of stator and rotor members.

8. In assembling turbines of the class described, the steps comprising first assembling a stator guide member with its bearing on the sleeve extension of the rotor, inserting the rotor shaft in its housing, thereafter applying said stator and rotor set to the shaft in said housing, and tightening the rotor sleeve in place on said shaft.

LLOYD YOST.